No. 688,662. Patented Dec. 10, 1901.
C. H. MILES.
GRAIN LIFTING ATTACHMENT FOR HARVESTING MACHINES.
(Application filed Mar. 27, 1901.)
(No Model.)
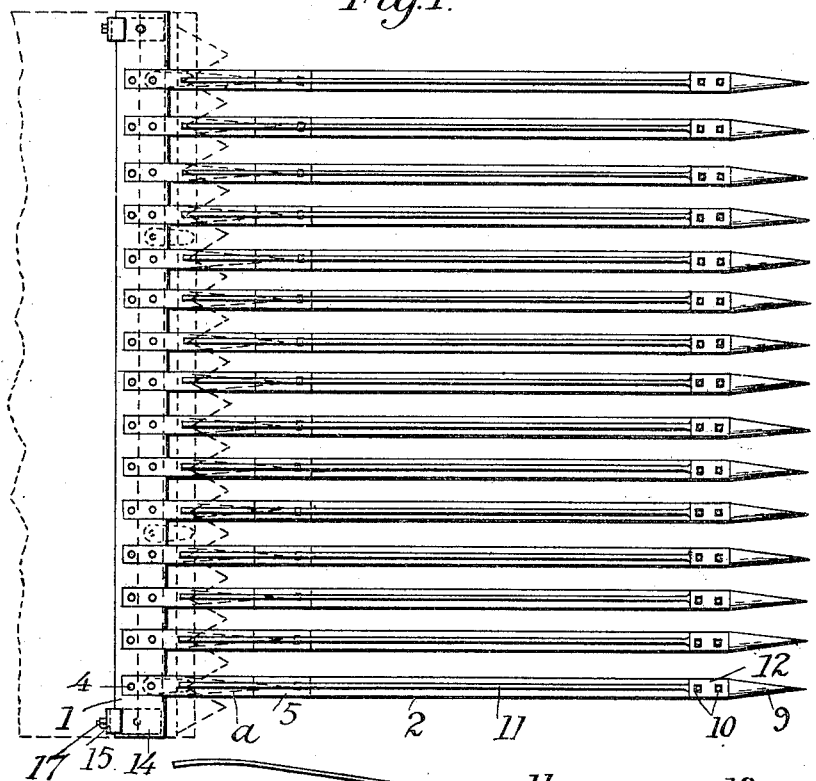
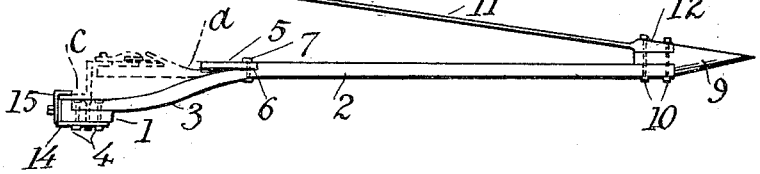
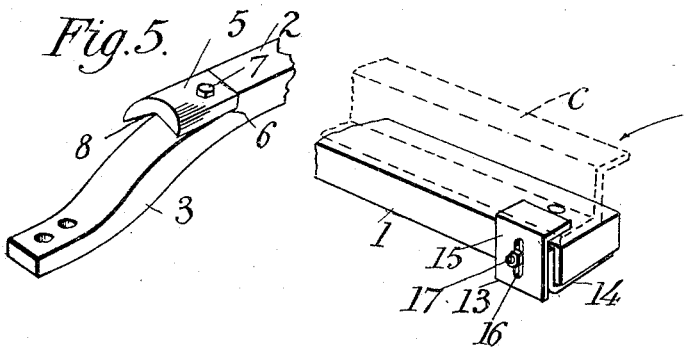
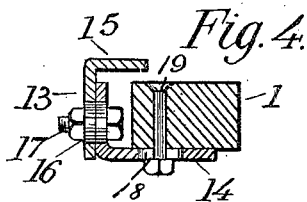
Witnesses:
J. S. Bower
J. W. Garner
Charles H. Miles, Inventor
by
Attorneys
THE NORRIS PETERS CO., PHOTO-LITHO., WASHINGTON, D. C.

UNITED STATES PATENT OFFICE.

CHARLES H. MILES, OF GUTHRIE, OKLAHOMA TERRITORY, ASSIGNOR OF ONE-HALF TO WILLIAM D. WORKMAN, OF GUTHRIE, OKLAHOMA TERRITORY.

GRAIN-LIFTING ATTACHMENT FOR HARVESTING-MACHINES.

SPECIFICATION forming part of Letters Patent No. 688,662, dated December 10, 1901.

Application filed March 27, 1901. Serial No. 53,095. (No model.)

*To all whom it may concern:*

Be it known that I, CHARLES H. MILES, a citizen of the United States, residing at Guthrie, in the county of Logan and Territory of Oklahoma, have invented a new and useful Grain-Lifting Attachment for Harvesting-Machines, of which the following is a specification.

My invention is an improved attachment for harvesting-machines adapted to raise fallen grain in advance of the cutting apparatus and support the same in an erect position while being cut and also adapted to prevent heavy grain from being tangled by the wind after it has been cut and while in the act of falling onto the platform conveyer.

My invention consists in the peculiar construction and combination of devices hereinafter fully set forth and claimed.

In the accompanying drawings, Figure 1 is a top plan view of my improved grain-lifting attachment, showing the same disposed in operative position on the cutting apparatus of a harvesting-machine, the said cutting apparatus being indicated in dotted lines. Fig. 2 is a side elevation of the same. Fig. 3 is a detail perspective view. Fig. 4 is a detail sectional view of the cross-bar of the grain-lifting attachment and the clamping-plates to secure it to the cross-bar of a harvester cutting apparatus. Fig. 5 is a detail perspective view of a portion of one of the dividing-bars and of the detachable plate thereon.

In the embodiment of my invention I provide a supporting cross-bar 1, the length of which is equal to that of the sickle-bar of a harvesting-machine. The said cross-bar is preferably made of iron or steel. A series of dividing-bars 2 are provided, which are preferably of the form here shown and have their rear portions inclined downwardly, as at 3, and bolted on the cross-bar 1, as at 4. On the upper side of each dividing-bar 2, at the front of the inclined portion 3 thereof, is bolted a plate 5. The said plate has its front portion fitted in a seat 6, with which the dividing-bar is provided, and is detachable from the dividing-bar by removing the bolt 7. The rear portion of the said plate extends rearward over the inclined portion 3 of the dividing-bar for a suitable distance, and the said plate is concaved on its under side, as at 8. On the front end of each dividing-bar, on the upper side thereof, is secured a dividing-point 9 by bolts 10. A spring lifting-bar 11 has a foot 12 formed at its front end, the latter being seated on the rear portion of the dividing-point, as shown, and secured thereto by the same bolts 10 which secure the dividing-point to the dividing-bar. Hence a spring lifting-bar 11 is disposed above each of the said dividing-bars. Said spring lifting-bars are inclined upwardly rearwardly from the dividing-points and are of such length that their rear ends are disposed over the cutting mechanism of a harvesting-machine when the attachment is secured in operative position on the latter.

In order to secure my attachment to a harvesting-machine, the points of the fingers *a* of the latter are inserted between the plates 5 and the dividing-bars 2, the concavities in the under sides of said plates being adapted to the shape of the points of said fingers, and the cross-bar 1 is disposed under the cross-bar *c* of the harvesting-machine frame and is secured to the latter, as shown in Fig. 2.

I provide clamps 13 to secure the cross-bar 1 to the cross-bar *c*. One of these clamps is at each end of the cross-bar 1, and each of said clamps comprises a pair of angle-plates 14 15. The angle-plates 14 are bolted to the under side and bear against the rear side of the cross-bar 1. The angle-plates 15 bear against the vertical rear portions of the plates 14 and project forward over the upper side of the cross-bar 1. The overlapping portions of said angle-plates 14 15 are provided with vertical adjusting-slots 16, and bolts 17 in said slots secure the said plates together and admit of the vertical adjustment of the plates 15, the latter bearing on the upper side of the cross-bar *c* of the harvester-frame and clamping the cross-bar 1 thereto, as is clearly shown in Fig. 3. Hence my improved clamps adapt my grain-lifting attachment to be attached to any form of harvesting-machine now in common use. The lower portions of the plates 14, which bear under the cross-bar 1, are provided with adjusting-slots 18 for the bolts 19, which secure said plates to the cross-bar, said slots adapting the said plates 14 to be adjusted on the cross-bar 1 as may be required by the width of the cross-bar c.

From the foregoing it will be understood that my improved lifting attachment operates in advance of the cutting mechanism of a harvester and partakes of the adjustments of the said cutting mechanism. The dividing-points, dividing-bars, and spring lifting-bars of my improved attachment serve to straighten tangled fallen grain and to lift up the same and support the grain in an erect position while being cut by the cutting apparatus, as will be understood, and, moreover, the grain is prevented from being tangled by the wind immediately after being cut and while falling onto the platform conveyer of the harvester. This last function is an exceedingly useful one, particularly when the grain is very tall and heavy.

My improved attachment is also exceedingly useful in grain which is light and short, as it retains the same in place between the dividing-bars and spring lifting-bars while being cut and imparts the requisite solidity or body thereto to render the cutting apparatus of the harvesting-machine entirely efficient.

Having thus described my invention, I claim—

1. A grain-lifting attachment for harvesting-machines comprising a cross-bar, dividing-bars having the downwardly and rearwardly inclined portions at their rear ends, said downwardly and rearwardly inclined rear portions being secured on said cross-bar, plates 5 detachably secured on said dividing-bars on the downwardly-inclined portions thereof, said plates being concaved on their rear lower sides to receive the points of the fingers, and lifting-bars on said dividing-bars, substantially as described.

2. In a harvester, a cutting apparatus provided with fingers and a cross-bar c in combination with a lifting attachment comprising a cross-bar 1, dividing-bars secured to said cross-bar 1, and having means to secure them to the points of the fingers, lifting-bars on said dividing-bars, angle-plates 14 secured on the under side of bar 1, and angle-plates 15 secured to said angle-plates 14 and engaging said cross-bar c, whereby said attachment is secured on said harvester, substantially as described.

3. In a grain-lifting attachment for harvesters, the combination of a dividing-bar, a dividing-point rabbeted on its rear, lower side, in which rabbet the front end of the dividing-bar is placed, said dividing-point being further provided with a rabbet on its rear, upper side, and a spring lifting-bar, having a foot at its front end, in said upper rabbet of said dividing-point, said dividing-bar, point and foot of said lifting-bar being detachably secured together, substantially as described.

In testimony that I claim the foregoing as my own I have hereto affixed my signature in the presence of two witnesses.

CHARLES H. MILES.

Witnesses:
R. R. CARLIN,
J. E. TURNER.